Feb. 27, 1940.  H. J. LA CASSE  2,191,763
DIFFERENTIAL
Filed Dec. 27, 1938

Hector J. La Casse, INVENTOR

BY Victor J. Evans & Co.

WITNESS  ATTORNEYS

Patented Feb. 27, 1940

2,191,763

UNITED STATES PATENT OFFICE 2,191,763

DIFFERENTIAL

Hector J. La Casse, Missoula, Mont.

Application December 27, 1938, Serial 247,884

2 Claims. (Cl. 74—389.5)

The invention relates to a differential and more especially to an overrun clutch type differential.

The primary object of the invention is the provision of a differential of this character, wherein the same is devoid of a countershaft, meshing gears or sliding parts, and has a continuous operation, the clutching action being effective at all times so that upon turning to the right or left, as the case may be, in the travel of a motor vehicle, that axle on the outside of the turn must necessarily turn the fastest due to the larger arc of rotation traversed by the wheels of the vehicle, this being taken care of by clutching action of the differential and on the vehicle's taking a straight course, both axles simultaneously assume driving functions.

Another object of the invention is the provision of a differential of this character, wherein a two-part axle has the meeting ends thereof loosely interfitted with each other and about these ends is a single clutch of the overrun type for cooperation simultaneously with both ends or individually with one end of either section of the axle while this clutch is operative with a driving element and is within the hub thereof so that power can be transmitted to either of the axle sections or to either of the same independently of one another, the differential being of novel construction and compact in assembly thereof.

A further object of the invention is the provision of a differential of this character, wherein the functioning thereof has the same effect for driving purposes of a differential structure in that both axle parts of a sectional axle can be driven together or either one individually driven.

A still further object of the invention is the provision of a differential of this character, which is simple in its construction, thoroughly reliable and efficient in operation, and inexpensive to manufacture and install. With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
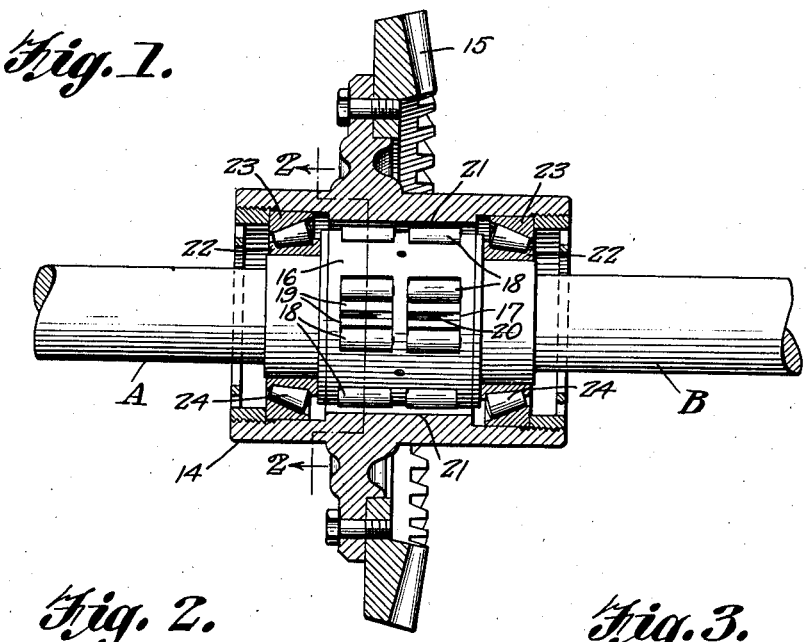
Figure 1 is an axial section of a differential constructed in accordance with the invention.

Referring to the drawing in detail, A and B, respectively, denote portions of a two-part driving axle for the driving of the wheels of a motor vehicle, as is conventional, and the part A in alignment with the longitudinal axis of the axle has formed therein a recess, socket or the like for accommodating an aligned projection 11 on the part B while interfitted between the wall of the socket or recess 10 and the said projection 11 are the anti-friction caged bearing rollers 12 and a bearing ball 13, respectively, for relative rotation of the sections A and B of the axle with the ends next to each other interfitted with each other.

Surrounding the interfitted ends of the sections A and B of the axle is the hub 14 of a driving gear 15 for transmitting power to the said axle in the operation of a motor vehicle for the driving thereof.

Figure 2:
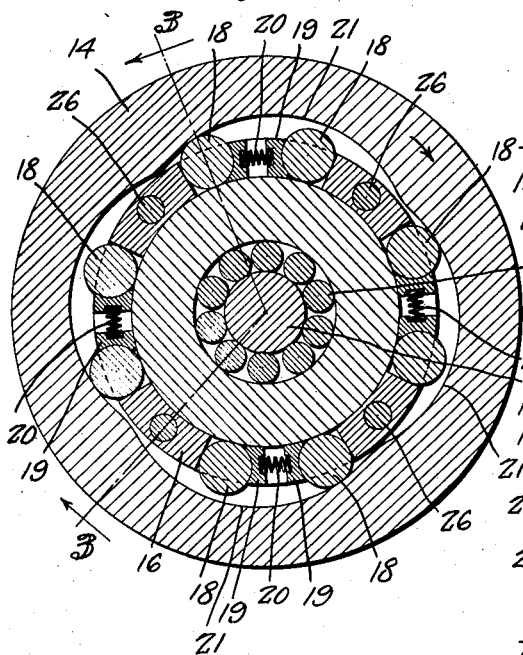
Figure 2 is an enlarged sectional view taken on the line 2—2 of Figure 1 looking in the direction of the arrows.
Figure 3:
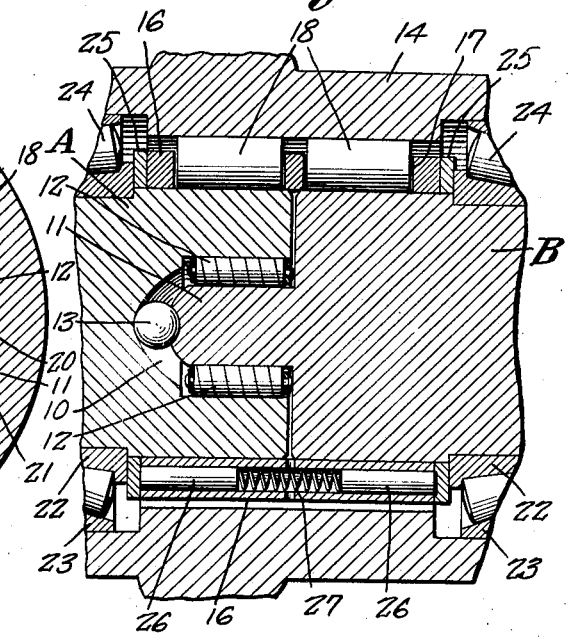
Figure 3 is a fragmentary sectional view taken on the line 3—3 of Figure 2 looking in the direction of the arrows.

Within the hub 14 between it and the interconnected ends of the sections A and B of the axle is an overrun roller clutch involving a sleeve-like cage 16 which snugly but loosely embraces the interfitted ends of the said sections A and B and has provided therein spaced circumferentially arranged slots or openings 17 forming clearances for clutching rollers 18, being a pair in each slot 17 and the rollers of each pair are separated from each other by spacer blocks or shoes 19, these maintaining rollers of each pair spread apart and against opposite ends of the slot containing the same. Between the blocks 19 in each slot 17 is a coiled spring 20 functioning for holding the block in a position to normally maintain the rollers 18 spread apart in the manner as is clearly shown in Figure 2 of the drawing. These rollers 18 have contact with the interfitted ends companion thereto of the sections A and B of the axle. In other words, one series of rollers 18 contacts with one end of a section of the axle and simultaneously the other group of rollers contacts with the other end of a section of said axle when these ends of the axle sections A and B are interfitted with each other within the sleeve-like cage 16.

Formed interiorly of the hub 14 and common to both groups of rollers 18 are the successively arranged circumferentially disposed radially arched pockets or grooves 21 of an extent for accommodating pairs of rollers 18 made up from the several groups of rollers. These pockets or grooves 21 enable overrun clutching action of the rollers 18, either in a clockwise or counter-clockwise direction of rotation of the hub 14 so that the ends interfitted with each other of the sections A and B of the axle can be simultaneously clutched or declutched by the rollers 18 acting within the pockets or grooves 21 or the said ends individually clutched thereby. Therefore, upon the turning of a motor vehicle to the right or left that half or section of the axle on the outside of the turn must necessarily turn the fastest due to the larger arc of rotation. This action automatically unlocks only those rollers 18 on that half of the axle section which is turning the fastest, allowing that section to revolve faster than the other, the latter in this instance being still connected by the rollers 18 to the driving gear 15. On completion of the turn of the motor vehicle, when both axle sections A and B are again revolving at equal speed, the spacer blocks 19 become active for relocking the rollers to the drive gear 15 and both axle ends, thus power being again restored to both axle sections with the result that their driving functions are resumed. The clutching action becomes positive when the driving gear 15 on revolving decreases the space within the pockets or grooves 21 in the hub 14 of said gear and the axle sections A and B are lacking in their momentum with the result that a squeezing and locking action is had by the rollers 18 upon the shaft ends of the sections A and B of the axle so that driving function of the latter is obtained, the pockets or grooves being radially arched effects wedging in spaces between the axle section ends A and B and the said hub 14 so that the rollers 18 automatically will clutch and declutch the axle ends and the hub 14 automatically for the making and breaking of the driving connections between the gear 15 and the said axle.

There is but a single clutch assembly between the gear 15 and the ends of the sections A and B of the axle and this assembly has groups of rollers 18, one being common to one axle end and the other common to the other axle end next to the interfitting of the said ends of the sections A and B so that these sections A and B can be individually or simultaneously clutched while these groups of rollers 18 cooperate with the hub 14 of the gear 15 and pairs of said rollers of both groups are confined within the pockets or grooves 21 interiorly of said hub and in this manner the locking and unlocking of one axle end or the locking and unlocking of both axle ends with the gear 15 will be had. The foregoing in the travel of a motor vehicle eliminates any back lash between the gear 15 and the sections A and B of the axle.

Arranged adjacent to opposite ends of the sleeve-like cage 16 and removably fitted within the hub 14 of the gear 15 are the inner and outer bearing cone parts 22 and 23, respectively, between which are arranged end thrust bearing rollers 24 while between the inner cones 22 and the ends next thereto of the sleeve-like cage 16 are ring washers 25, the sleeve-like cage 16 being fitted with spring-pressed plungers 26 for pressing against said washers 25, the presser springs for the said plungers 26 being indicated at 27, and in this manner a fixed relationship in the clutch assembly is assured countering hand thrust.

What is claimed is:

1. A differential of the kind described comprising a sleeve-like member forming a driving element, a two-part axle extending through the said member and having the ends of its parts next to each other rotatably interfitted one within the other, anti-friction means located between the interfitted portions of the parts of said axle, an internal clutch face formed in said member, a sleeve-like cage loosely embracing the interfitted ends of said axle, clutching rollers confined by said cage for coacting with the clutch face and simultaneously and individually with the said interfitted ends of the axle, and means within the cage and active upon the clutching rollers for holding the same yieldably tensioned spaced from each other.

2. A differential of the kind described comprising a sleeve-like member forming a driving element, a two-part axle extending through the said member and having the ends of its parts next to each other rotatably interfitted one within the other, anti-friction means located between the interfitted portions of the parts of said axle, an internal clutch face formed in said member, a sleeve-like cage loosely embracing the interfitted ends of said axle, clutching rollers confined by said cage for coacting with the clutch face and simultaneously and individually with the said interfitted ends of the axle, means within the cage and active upon the clutching rollers for holding the same yieldably tensioned spaced from each other, and tensioned plungers fitting said cage for indirectly engaging the parts of said axle for maintaining a fixed relationship of the clutching rollers and the clutch face within the said member.

HECTOR J. LA CASSE.